United States Patent [19]

Nimes

[11] 3,728,618

[45] Apr. 17, 1973

[54] GROUND PROTECTION APPARATUS FOR ELECTRICAL EQUIPMENT WITH Y-CONNECTED WINDINGS

[75] Inventor: Karl Nimes, Erlangen, Germany

[73] Assignee: Siemens Aktiengesellschaft, Munich, Germany

[22] Filed: Mar. 28, 1972

[21] Appl. No.: 238,847

[30] Foreign Application Priority Data

Apr. 1, 1971  Germany..................P 21 15 807.6

[52] U.S. Cl....................324/51, 317/18 D, 340/255
[51] Int. Cl. .................G01r 31/02, H02h 7/06
[58] Field of Search ..................324/51, 52; 340/255; 317/18 R, 18 A, 18 B, 18 C, 18 D

[56] References Cited

UNITED STATES PATENTS

| | | | |
|---|---|---|---|
| 1,624,484 | 4/1927 | Evans | 340/255 |
| 2,162,531 | 6/1939 | Evans | 317/18 R |
| 2,594,994 | 4/1952 | Rich | 324/51 |
| 3,178,639 | 4/1965 | Hillman | 324/51 X |
| 3,196,316 | 7/1965 | Crom | 317/18 C |
| 3,343,080 | 9/1967 | Fox | 340/255 X |
| 3,343,154 | 9/1967 | Seesselberg | 340/255 |
| 3,492,567 | 1/1970 | Rissolo | 340/255 X |

*Primary Examiner*—Gerard R. Strecker
*Attorney*—Hugh A. Chapin

[57] ABSTRACT

Apparatus for the detection of grounds occurring at or near the neutral point of Y-connected windings of electrical equipment is disclosed. Between the neutral point and ground a load resistor is connected as part of a bridge circuit. A bias voltage source having a frequency different from that of the system is connected to one diagonal of the bridge circuit. A potentiometer is connected across the second bridge diagonal and its voltage is evaluated by a time measuring device to determine the spacing between the zero voltage crossings of the potentiometer. The time measuring device transmits a signal indicating a ground if the time intervals between two successive zero crossings of the voltage in the potentiometer differ from each other by a predetermined amount or if a predetermined time interval between successive zero crossings is exceeded.

7 Claims, 4 Drawing Figures

GROUND PROTECTION APPARATUS FOR ELECTRICAL EQUIPMENT WITH Y-CONNECTED WINDINGS

FIELD OF THE INVENTION

This invention is concerned in general with the protection of electrical equipment against electrical grounding. More particularly, the invention is concerned with the detection of electrical grounds at, or near to, the neutral point of electrical equipment having Y-connected windings.

BACKGROUND OF THE INVENTION

Many various arrangements are used to protect electrical equipment having Y-connected windings, by detecting the ground at, or near to, the neutral point of the machine.

All such ground protection devices commonly obtain an indication of a ground by using a voltage difference or potential above ground at the neutral point of the windings associated with the electrical equipment.

In the case of a synchronous generator this neutral point potential may already be present in the third harmonic generated by it. Frequently, however, it is not always certain that this third harmonic is present under all load conditions of the equipment. Therefore, a voltage source must be inserted between the neutral point and ground to assure a voltage difference. A d-c voltage source or an a-c voltage source of the line frequency or of a frequency different from that of the line can be used as the voltage source. From this the advantages as well as the disadvantages of the different ground protection devices result.

The difficulty in detecting a ground at, or near, the neutral point lies mainly in the fact that all electrical equipment is connected to a power supply system, while the ground protection should extend only to those parts which are in metallic connection with the Y-connected windings. In the case of a synchronous machine this means that the winding of the synchronous machine and the windings of a connected transformer constitute the area to be protected against grounding. These transformer windings have coupling capacitances with the other windings, through which interference voltages from the line can be induced in the windings of the electrical equipment. These interference voltages have either the line frequency or certain harmonic frequencies thereof. If an a-c voltage of the line frequency is used to give the neutral point a potential above ground, it must be chosen larger than the above-mentioned interference voltages in order to clearly distinguish from these line-induced interference voltages. The magnitude of the interference voltages can in principle be limited by a load resistor connected between the neutral point and ground if the former is chosen low enough; however, connecting a load resistor in this manner results in an increase in the ground current in the event of a short circuit to ground.

If one wishes to avoid a high bias potential as well as a high ground current, one can choose as the bias voltage for the neutral point a voltage with a frequency other than that of the line. High frequencies are poorly suited for this purpose as they would drive large currents through the ground capacitances of the Y-connected windings and the lines connected thereto. Low frequencies are more advantageous in spite of the higher cost for filters needed to filter out the current having a frequency of the voltage source between the neutral point and ground. In any event, a voltage source with a frequency other than that of the power supply system is required, i.e., in general, a free-running inverter supplied from a d-c voltage source.

Because of the high impedance of the distributed capacity of the electrical equipment to be protected, low frequencies are better suited, but as indicated above they lead to very high costs for filters to filter out the current having the same frequency as the voltage source between the neutral point and ground. Moreover, stringent requirements are placed on the freedom from harmonics of the bias potential source, in order to improve the filter action.

It is therefore an object of the invention to create a ground protection apparatus for the detection of grounds, particularly grounds at the neutral point or in its vicinity, without the danger that false alarms can occur through grounds outside of the electrical equipment, for instance, in parts of the system which are connected with it by a transformer.

SUMMARY OF THE INVENTION

According to the present invention, the objects of the invention are achieved and the disadvantages of the prior art are overcome by constructing ground protection apparatus for electrical equipment having Y-connected windings by connecting a load resistor of relatively high resistance between the neutral point of the windings and ground as an arm of a resistive bridge circuit. To one diagonal of the bridge circuit a bias voltage source is connected, having a different frequency than the line frequency. A potentiometer is in turn connected between the second diagonal of the bridge. To this potentiometer a time measuring device, such as a counter, is so connected that it detects the time intervals between the zero crossings of the voltage induced in the potentiometer by either the voltage source in the case of a ground, or interference voltages formed by the line frequency or its harmonics. The counter is connected to only emit an output signal for the indication of a ground if either the time interval between two successive zero crossings is approximately as long as the reciprocal of the bias voltage frequency or if the time interval between successive zero crossings differ by more than a minimum value.

To produce this output signal the counting input of the counter is controlled by a clock which is connected through a threshold stage to the rectified output voltage of the second bridge diagonal. The direction of counting is in turn determined by the polarity of the voltage induced in the potentiometer connected as the second bridge diagonal. An evaluating device follows the counter and emits a signal if a predetermined maximum count is exceeded or a count substantially different from zero is present at the end of the voltage period. The evaluating device can comprise an OR stage having an input signal on one input if the count substantially exceeds the count normally reached for the line frequency and an input signal on the other input if simultaneously a count differing slightly from zero is exceeded and the voltage period in which the measurement takes place is completed.

DESCRIPTION OF THE DRAWINGS

An example of an embodiment of the invention is shown in FIG. 1. The manner of operation for equipment without an electrical ground or fault is shown in the curves of FIG. 2.

DESCRIPTION OF THE PREFERRED EMBODIMENT

Figure 1:
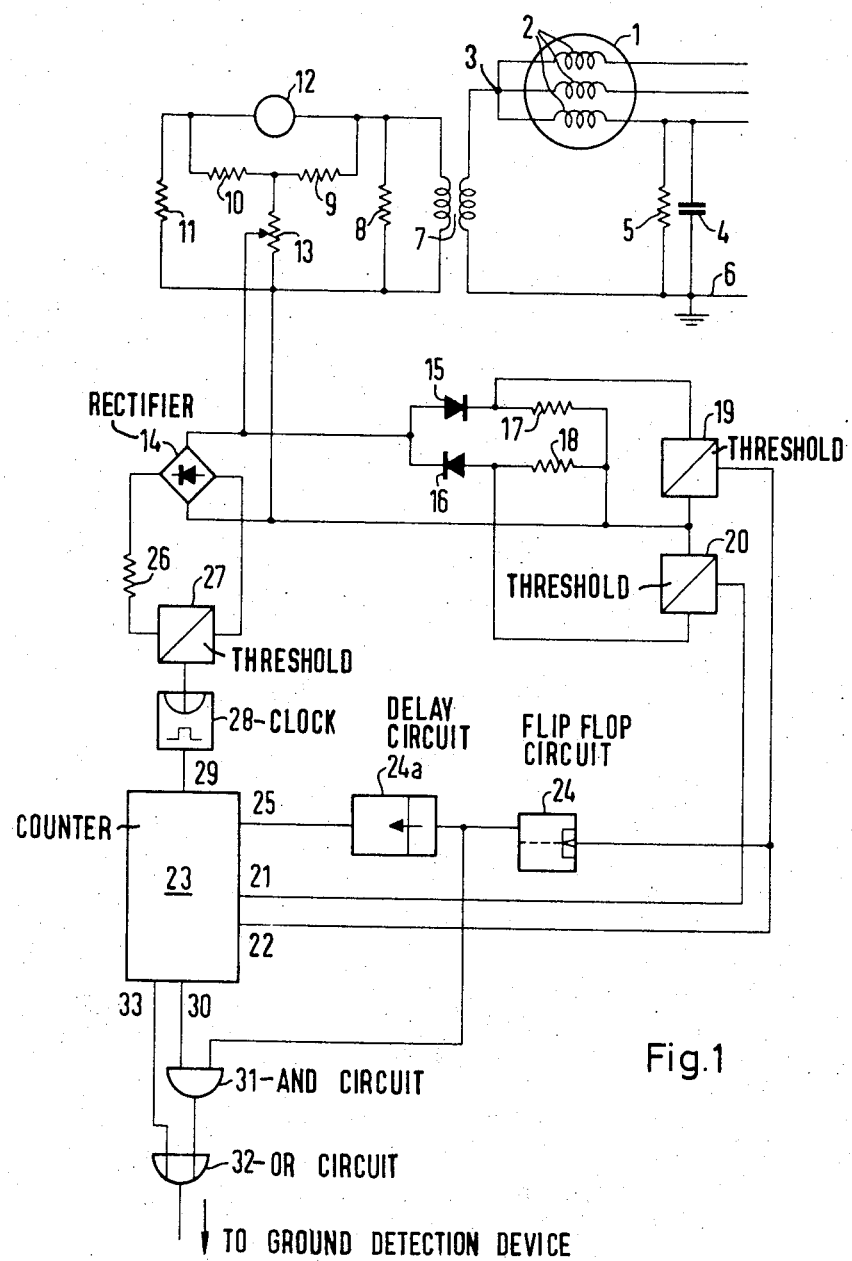

In FIG. 1, the equipment to be protected is illustrated, for example, as a generator 1 with windings 2, connected together on one side at the neutral point 3. The distributed capacity and the insulation resistance of one phase of the generator are indicated by capacitor 4 and resistance 5, respectively. Between the neutral point 3 and ground 6 one winding of a transformer 7 is connected. The second winding of the transformer 7 is connected to a load resistor 8. The load resistor 8, in turn, is connected with resistors 9, 10 and 11 to form a bridge circuit. Connected in one diagonal of the bridge circuit is a bias potential source 12 which, for example, generates a voltage having a frequency less than the line frequency. Connected into the second bridge diagonal is a potentiometer 13, the tap and lower terminal of which are connected to the a-c terminals of a rectifier 14. Connected in shunt to the a-c terminals of the rectifier 14 are two oppositely connected diodes 15 and 16, each of which is connected in series with a resistor 17 and 18, respectively. Connected in shunt with the resistors 17 and 18 are threshold stages 19 and 20, respectively. The outputs of the threshold stages are connected to the directional inputs 21 and 22 of counter 23 for forward and reverse counting. The output of the threshold stage 19 is also connected as an input to a flipflop circuit 24 in such a manner that the flipflop switches from one state to the other for each newly arriving signal. On the output side, the flipflop 24 is connected through a delay device 24a to the reset input 25 of the counter 23, and also to the input of an AND circuit 31 connected to the output of the counter 23.

A threshold stage 27 is connected to the d-c terminals of the rectifier 14 by a limiting resistor 26. The threshold stage 27 is adjusted to a somewhat higher value than the threshold stages 19 and 20. The output of this threshold stage 27 is connected to the input of a clock 28 which is thereby switched on when the threshold stage 27 has responded. The output of the clock 28 is connected to the counting input of counter 23. Output 30 of the counter 23 is fed to the second input of the AND circuit 31. The circuit inside the counter is designed so that a signal occurs at the output 30 of the counter 23 only if a definite value, different from zero, is stored in the counter 23. This value is determined only by the tolerance limits of the circuits used. The output of AND circuit 31 is connected to one input of OR circuit 32. The second input of OR circuit 32 is connected to the output 33 of the counter 23.

If the frequency of the bias potential source 12 is lower than the line frequency, the output 33 of the counter 23 carries a signal only when the reading of the counter 23 exceeds a value reached by the clock during one cycle of the line voltage or interference voltage. The output signal at the OR circuit 32 can then be fed, for instance, to a ground detection relay or to operate the release of switches or indicate in some other manner the occurrence of the ground in the generator.

Figure 2:
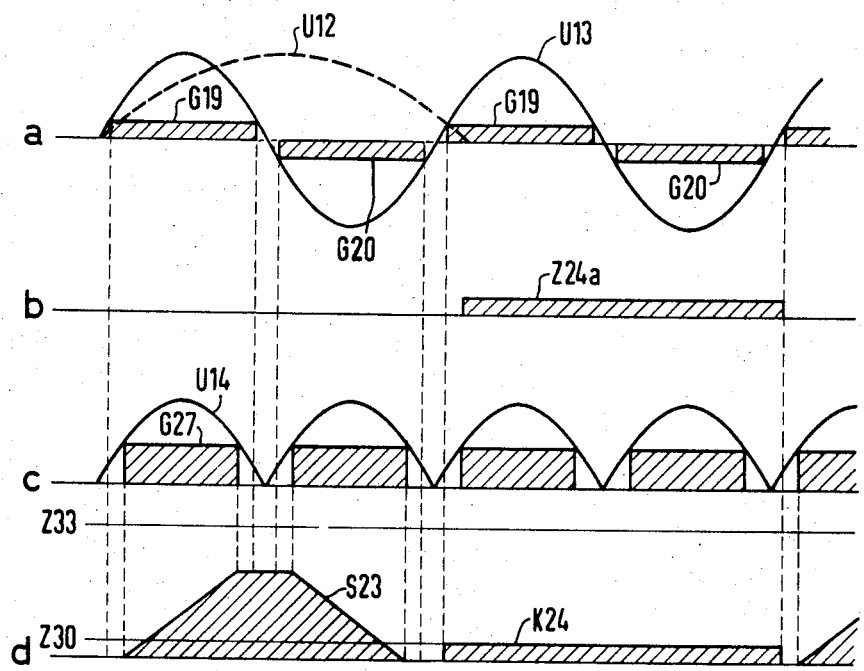

The operation of the circuit according to FIG. 1 will now be described, with reference to FIG. 2. In FIG. 2a the voltage at potentiometer 13 is shown as the curve U13. The positive half-waves of this voltage drive the threshold stage 19 through diode 15 in such a manner that the output signal of the threshold stage 19 corresponds to the curve G19 in FIG. 2a. In a similar manner the curve G20 is generated as the output signal of the threshold stage 20. The output signal of the threshold stage 19 is fed to flipflop circuit 24, so that the curve Z24a is present at the reset input 25 of the counter 23 as shown in FIG. 2b. The latter corresponds to the signal appearing at the output of the delay stage 24a.

The voltage appearing at the d-c terminals of the rectifier 14 is shown in FIG. 2c as curve U14. This voltage is fed to the input of the threshold stage 27, so that a signal corresponding to the curve G27 appears at its output. The threshold of the threshold stage 27 is adjusted to a higher value than that of the threshold stages 19 and 20, so that the clock 28 is switched on and remains on only as long as a signal is present at one of the directional inputs 21 or 22. The reading of the counter 23 is plotted in FIG. 2d as the curve S23.

If it is now assumed that no fault is present in the equipment to be protected, but that an induced interference voltage occurs between the phase conductors and ground, a voltage drop then appears across the load resistor 8, and a voltage proportional thereto then appears at the potentiometer 13. If, for example, this voltage has a frequency of 50 Hz, higher than the frequency of the supplemental voltage source 12, the threshold stage 27 will only remain activated for such a short time that the pulses counted by the clock 28 and passed into the counter 23 are not sufficient to generate an output signal at the output 33 of the counter 23. The required voltage for a counter reading is designated as the limit value Z33 in FIG. 2d. The counter reading required to generate a signal at the output 30 of the counter 23 is also shown as the limit Z30 in FIG. 2d. It is thus shown that the count shown by curve S23 quickly exceeds this latter value so that one condition for switching on the AND circuit 31 exists. The second input of the AND circuit 31 is connected to the output of the flipflop 24 which, however, carries no signal during one measuring period. Consequently, the condition for the AND circuit 31 is not fulfilled, so that a signal is not present at the output of the OR circuit 32.

In FIG. 2d the curve K24 is also shown. From this curve it can be seen that at the next response of the threshold stage 19, the input of the AND circuit 31, connected with the output of the flipflop 24, carries a signal. As the reset input 25 of the counter 23 is driven by the delay device 24a from the output of the flipflop 24, a check is made during the time delay of the delay device 24a to determine whether after the end of the measurement period, which is equal to a period of the voltage at the potentiometer 13 (curve U13), the count shown by curve S23 still exceeds the value given by the threshold Z30.

When the bridge circuit consisting of the resistors 8, 9, 10 and 11 is balanced, the voltage of the bias potential source 12 causes no voltage drop at the potentiometer 13, so that the positive and the negative half-waves of the voltage at the potentiometer 13 are of equal magnitude. Consequently, the count at the end of the measuring period will have returned approximately to a zero value, so that after the completion of the measuring period no signal is present at the output of the OR circuit 32.

Figure 3:
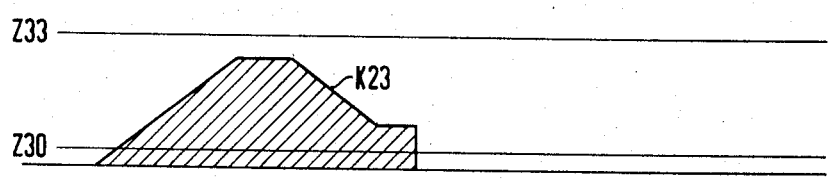
In FIGS. 3 and 4 the same readings are indicated when a ground fault occurs with and without interference voltage, respectively.

In FIG. 2a is additionally plotted as the curve U12 the voltage of the bias voltage source 12 (dashed line). A quantity proportional to this voltage appears at the potentiometer 13 if, for example, a ground occurs at the neutral point 3 or in its vicinity. If this occurs the load resistor 8 is then completely or partially short-circuited and therefore the bridge circuit is no longer balanced. If, therefore, a ground is present at the neutral point or in its vicinity, the voltages according to the curves U12 and U13 will add at the potentiometer 13. This results in a reading of the counter 23 according to curve K23 in FIG. 3. The limit Z33 is not reached, but because of the shift in the zero crossing, the time in which the threshold stage 20 emits an output signal is shorter, and the response time of the threshold stage 19 is longer than for operation without fault. At the end of the measuring period, when the flip-flop 24 emits an output signal, the count will consequently be above the limit Z30. Therefore, an output signal will be present at the output 30 of the counter 23, so that a signal will appear at the output of the flip-flop 24 and the condition for the AND circuit 31 is fulfilled, and the OR circuit 32 transmits a signal to a connected ground detection device.

Figure 4:
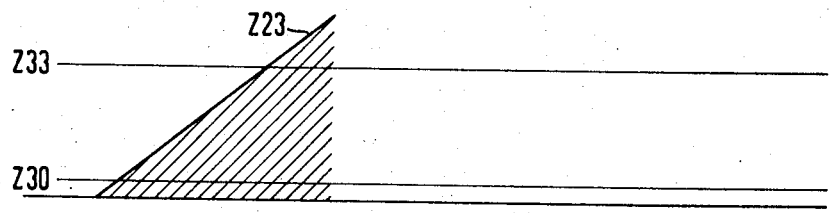

In the instances where no interference voltage is present and only the voltage of the bias voltage source according to curve U12 exists, if a ground occurs in the equipment to be protected, the count will rise beyond the limit Z33, as is shown in FIG. 4. The intersection of the count shown in curve Z23 in FIG. 4 with the limit Z33 gives the point in time from which a signal is present at the output 33 of the counter 23. As this output is directly connected to the OR stage 32, the latter will produce an output signal and thereby indicate the presence of the ground.

In the example of the embodiment it is assumed that the frequency of the bias voltage source 12 is below the line frequency of the interference voltages which appear across the load resistor 8. This low frequency has the advantage that only a small current flows through the distributed capacity 4 of the generator 1, so that small values will suffice for the bias voltage and the bias current. In principle, however, a higher frequency than the line frequency can also be chosen for the bias voltage source 12. In this case, however, the evaluation circuit for the reading of the counter 23 must be modified so that the tripping takes place not at the voltage with the lower frequency but at the voltage with the higher frequency.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. Apparatus for detecting grounds at or near the neutral point between Y-connected windings of alternating voltage electrical equipment, the apparatus comprising a resistive bridge circuit, one arm of which comprises a load resistor connected between the neutral point of the windings and ground, a bias voltage source connected to one diagonal of the bridge circuit, the frequency of the bias voltage source differing from the line frequency of the electrical equipment, a potentiometer connected to the second diagonal of the bridge circuit in which an alternating current voltage is induced by either the line frequency or, when a ground occurs at or near the neutral point between the windings, by the bias voltage source, time measuring means connected to the potentiometer to detect the time interval between the zero crossings of the a-c voltage signal induced in the potentiometer, the time measuring means emitting an output signal indicating an occurrence of a ground in the windings if the voltage signal in the potentiometer exceeds a predetermined minimum value during the measured time interval between two successive zero crossings of the voltage in the potentiometer or if the voltage at the end of the time interval between two successive zero crossings is more than a predetermined minimum value.

2. Ground detection apparatus as set forth in claim 1 in which the time measuring means comprises rectifier means connected to the potentiometer to produce a positive rectified output voltage signal, a threshold circuit connected to the output of the rectifier to respond at a predetermined positive voltage output from the rectifier, a clock connected to the output of the threshold circuit, a counter the counting input of which is connected to the output of the clock, counter control means connected between the potentiometer and the counter to control the direction of the counting in the counter by the polarity of the voltage in the potentiometer and the time of the counting by the duration of the voltage cycle of the potentiometer, and evaluating means connected to the output of the counter to emit a signal if a predetermined maximum count is exceeded by the counter or a count above a predetermined minimum is present at the end of the voltage cycle in the potentiometer, both of which signals indicate the occurrence of a ground in the windings.

3. Ground detection apparatus as set forth in claim 2 in which the counter has at least two outputs and produces an output signal at the first output indicating a ground when the count of the counter exceeds a first predetermined voltage level which is above that voltage reached in the counter when the potentiometer voltage is caused by the line voltage, the first output signal thereby indicating the occurrence of a ground, the counter producing an output signal at the second output when the count of the counter exceeds a second predetermined voltage level, an OR circuit, one input of which is connected to the first output of the counter, the OR circuit thereby emitting a signal indicating a ground when a signal is transmitted to it by the first output of the counter, an AND circuit having a first input connected to the second output of the counter and a second input from a control means comprising a circuit connected between the potentiometer and the AND circuit which emits a signal to the AND circuit after the completion of the voltage cycle in the potentiometer, the output of the AND circuit being connected to the second input of the OR circuit and emitting a signal thereto indicating the occurrence of a ground when the output of the counter is above the second predetermined voltage level after the completion of a counting cycle.

4. Ground detection apparatus as set forth in claim 3 wherein the control means for the AND circuit comprises a half-wave rectifier circuit producing a positive output during the positive voltage cycle in the potentiometer, a flipflop circuit connected to the output of the rectifier circuit to conduct during alternate voltage cycles in the potentiometer, the output of the flipflop connected to the second input of the AND circuit.

5. Ground detection apparatus as set forth in claim 4 in which a utilization device is connected to the output of the OR circuit to indicate the occurrence of a ground in the windings.

6. Ground detection apparatus as set forth in claim 5 in which the utilization device comprises a ground detection relay to indicate the occurrence of a ground in the windings.

7. Apparatus for detecting grounds at or near the neutral point between Y-connected windings of alternating voltage electrical equipment, the apparatus comprising a voltage transformer having a primary winding connected between the neutral point and ground, and a secondary winding, a load resistor connected across the secondary winding of the voltage transformer and forming an arm of a resistive bridge, a voltage bias source connected to one diagonal of the bridge and having a frequency less than the line frequency of the electrical equipment, a potentiometer connected to the second diagonal of the bridge in which alternating voltages occur proportional to the line frequency or, when a ground occurs in the windings, proportional to the bias voltage, rectifier means connected to the potentiometer to produce a positive rectified output voltage signal when an alternating voltage occurs in the potentiometer, the output of said rectifier means being fed to a threshold stage adapted to respond to a predetermined positive voltage output from the rectifier means, a clock connected to the output of the threshold stage to produce an output signal triggered by the threshold stage, a counter having a counting input connected to the output of the clock, a reset input, positive and negative directional inputs and two counting outputs, a second rectifier means connected to the potentiometer to produce a positive and negative rectified voltage output signal during the positive and negative voltage cycles of the voltage in the potentiometer, the second rectifier means connected to the positive and negative directional inputs of the counter to trigger the counter to positively count during positive cycles of the potentiometer voltage and negatively count during negative cycles of the potentiometer voltages, a flipflop circuit connected to the positive rectified output of the rectifier means to conduct on alternate cycles of the potentiometer voltage, the output of the flipflop circuit connected to a delay device, the output of which is connected to the reset input of the counter and resets the counter after the completion of a cycle of the potentiometer voltage, the first counting output of the counter connected directly to one input of an OR circuit and adapted to emit an output signal to the OR circuit when a first predetermined count has been exceeded in the counter during a counting cycle, the signal thereby indicating the occurrence of a ground in the windings, the second counting output of the counter connected as an input to an AND circuit and adapted to emit an output signal from the counter when a second predetermined count has been exceeded by the counter, the AND circuit having a second input connected to the output of the flipflop circuit at which a signal occurs on alternate cycles of the potentiometer voltage, the output of the AND circuit connected as the second input to the OR circuit, the AND circuit thereby emitting a signal to the OR circuit indicating the occurrence of a ground when the second predetermined count of the counter has been exceeded and the flipflop circuit has emitted a signal indicating the completion of the counting cycle.

* * * * *